US009286537B2

(12) United States Patent
Radha Krishna Rao et al.

(10) Patent No.: US 9,286,537 B2
(45) Date of Patent: Mar. 15, 2016

(54) SYSTEM AND METHOD FOR CLASSIFYING A SKIN INFECTION

(71) Applicant: Cognizant Technology Solutions India Pvt. Ltd., Chennai (IN)

(72) Inventors: Geelapaturu Subrahmanya Venkata Radha Krishna Rao, Chennai (IN); Karthik Sundararaman, Chennai (IN); Arun Muthuraj Vedamanickam, Tirupur District (IN); Natarajan Venkatachalem, Erode (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 2 days.

(21) Appl. No.: 14/227,615

(22) Filed: Mar. 27, 2014

(65) Prior Publication Data

US 2015/0206022 A1    Jul. 23, 2015

(30) Foreign Application Priority Data

Jan. 22, 2014   (IN) .............................. 277/CHE/2014

(51) Int. Cl.
| | | |
|---|---|---|
| *G06K 9/00* | (2006.01) | |
| *G06K 9/62* | (2006.01) | |
| *G06K 9/34* | (2006.01) | |
| *G06K 9/46* | (2006.01) | |
| *G06K 9/66* | (2006.01) | |

(Continued)

(52) U.S. Cl.
CPC .............. *G06K 9/4604* (2013.01); *G06K 9/52* (2013.01); *G06K 9/6269* (2013.01); *G06T 7/0014* (2013.01); *G06T 7/0081* (2013.01); *G06K 2209/05* (2013.01); *G06T 2207/30088* (2013.01)

(58) Field of Classification Search
None
See application file for complete search history.

(56) References Cited

U.S. PATENT DOCUMENTS 6,081,612 A  *  6/2000  Gutkowicz-Krusin et al. ............................. 382/128
8,109,875 B2      2/2012  Gizewski (Continued)

FOREIGN PATENT DOCUMENTS

WO    WO 2012134264 A2  *  10/2012

OTHER PUBLICATIONS

Florence Tushabe et al., "An image-based diagnosis of virus and bacterial skin infections" School of Computing and I.T., Makerere University, Kampala, Uganda, [tushabe,emwebaze,fkiwanuka]@cit.mak.ac.ug, 2011.

*Primary Examiner* — Matthew Bella
*Assistant Examiner* — Jose M Torres
(74) *Attorney, Agent, or Firm* — Cantor Colburn LLP

(57) ABSTRACT

A system and computer-implemented method for classifying skin disorders using an image of a skin portion is provided. The system comprises a server configured to receive the image of the skin portion from an electronic communication device and process the received image of the skin portion, wherein the processing comprises at least one of: resizing, removing artifacts and noise, applying new color space, sharpening the image and correcting background. Furthermore, the server is configured to segment the processed image to identify the region of interest within the processed image and extract one or more features from the identified region of interest. The system further comprises a trained learning module configured to classify the skin disorder by mapping the extracted features with pre-stored images, wherein the pre-stored images that map with the extracted features are associated with a particular category of skin disorder.

15 Claims, 5 Drawing Sheets

(51) Int. Cl.
*G06T 7/00* (2006.01)
*G06K 9/52* (2006.01)

(56) References Cited

U.S. PATENT DOCUMENTS

2002/0039434 A1* 4/2002 Levin et al. ............ 382/128
2008/0051638 A1 2/2008 Iliff
2009/0318815 A1* 12/2009 Barnes et al. ............ 600/473
2010/0279718 A1 11/2010 Borve
2011/0301441 A1* 12/2011 Bandic ............ A61B 5/0059
                                                            600/306
2014/0036054 A1* 2/2014 Zouridakis ............ 348/77
2015/0150457 A1* 6/2015 Wu et al. ............ 600/425

* cited by examiner

SYSTEM AND METHOD FOR CLASSIFYING A SKIN INFECTION

FIELD OF THE INVENTION

The present invention relates to a system and method for classifying a skin infection. More specifically, the present invention relates to a system and method for classifying a skin infection by processing an image of an infected skin portion using a computing system.

BACKGROUND OF THE INVENTION

With an increasing use of chemicals in day to day life of common individual and depleting Ozone layer in the atmosphere, skin related disorders are on the rise. Most of such skin related disorders may be cured completely or managed if the diagnosis of the disorder is carried over in time and the individual suffering from the same or patient gets required medication. However, diagnosis of disorder is not easy as availability of dermatologist is less in rural and less populated areas. Therefore, due to efforts required in travelling to visit a dermatologist at distant place, many people ignore such disorders that result in worsening of infection.

A plurality of skin infections may be diagnosed by physical examination of the affected skin portion. Therefore, requirement of physical presence of a patient may be eliminated by sending an image of the infected skin portion of the patient to a dermatologist. In the present time when communication means has enhanced to the extent that a digital image may be transferred from one place to another distant place using telecommunication means or internet, the image of the infected skin portion may be displayed to the dermatologist using the said telecommunications means commonly known as tele-medication. However, unavailability of the dermatologist may delay the process of diagnosis.

There are few scanners available which may take a high quality image of the infected skin portion and provide details required for identifying a skin disorder. However, such scanners are not commonly available. Such scanners are usually available with the dermatologist. Therefore, said scanners do not eliminate the requirement of visiting a dermatologist for initial diagnosis.

Few Computer software are also available that may diagnose the skin disorder by extracting the features from the image of the infected skin portion and comparing the said extracted feature from the feature list for skin disorders. However, such computer software require very high quality image to enable them to extract features. Therefore, it is not possible for most of the patients to get high quality images to feed in such software to get the diagnosis.

Accordingly, there is a need of a system that is easily and widely accessible by people through a common channel. Moreover, there is a need of system whose cost of ownership is less for common public to avail its service of diagnosing skin disorders. Further, there is a need of a computing system that is capable of diagnosing plurality of skin infections by reviewing the images taken from some commonly available image capturing device. Moreover, there is a need of a computing system that is capable of diagnosing plurality of skin infections and providing the result of the diagnosis in minimal time.

SUMMARY OF THE INVENTION

A system and computer-implemented method for classifying skin disorders using an image of a skin portion is provided. The system comprises a server configured to receive the image of the skin portion from an electronic communication device. The server is further configured to process the received image of the skin portion, wherein the processing comprises at least one of: resizing, removing artifacts and noise, applying new color space, sharpening the image and correcting background. Furthermore, the server is configured to segment the processed image to identify the region of interest within the processed image and extract one or more features from the identified region of interest. The system further comprises a trained learning module, comprising a repository of pre-stored images, configured to classify the skin disorder by mapping the extracted features with the pre-stored images, wherein the pre-stored images that map with the extracted features are associated with a particular category of skin disorder.

In an embodiment of the present invention, the server is further configured to render the classification of the skin disorder by the trained learning module on the electronic communication device. In an embodiment of the present invention, the electronic communication device comprises a camera for capturing the image of the skin portion. In an embodiment of the present invention, the one or more extracted features from the identified region of interest are at least one of: texture, shape, asymmetry, color variation, border irregularity and diameter.

In an embodiment of the present invention, the categories of skin disorders are at least one of: skin cancer, melanoma, fungal infection, viral infection, bacterial infection and dry skin. In an embodiment of the present invention, the processed image is segmented using principal component transformation and fuzzy-c means algorithm to identify the region of interest within the processed image. In an embodiment of the present invention, the region of interest within the processed image is the infected skin portion. In an embodiment of the present invention, the trained learning module is a back propagation neural network.

The computer-implemented method for classifying skin disorders using an image of a skin portion, via program instructions stored in a memory and executed by a processor, comprises receiving the image of the skin portion from an electronic communication device. The computer-implemented method further comprises processing the received image of the skin portion, wherein the processing comprises at least one of: resizing, removing artifacts and noise, applying new color space, sharpening the image and correcting background. Furthermore, the computer-implemented method comprises segmenting the processed image to identify region of interest within the processed image. The computer-implemented method also comprises extracting one or more features from the identified region of interest. In addition, the computer-implemented method comprises classifying the skin disorder by mapping the one or more extracted features with pre-stored images, wherein the pre-stored images that map with the one or more extracted features are associated with a particular category of skin disorder. The computer-implemented method further comprises rendering the classification of the skin disorder on the electronic communication device.

In an embodiment of the present invention, the electronic communication device comprises a camera for capturing the image of the skin portion. In an embodiment of the present invention, the one or more extracted features from the identified region of interest are at least one of: texture, shape, asymmetry, color variation, border irregularity and diameter. In an embodiment of the present invention, the categories of skin disorders are at least one of: skin cancer, melanoma, fungal infection, viral infection, bacterial infection and dry skin.

In an embodiment of the present invention, the step of segmenting uses at least one of: principal component transformation and fuzzy c-means algorithm to identify the region of interest within the processed image. In an embodiment of the present invention, the region of interest within the processed image is the infected skin portion.

A computer program product for classifying skin disorders using an image of a skin portion is provided. The computer program product comprises a non-transitory computer-readable medium having computer-readable program code stored thereon, the computer-readable program code comprising instructions that when executed by a processor, cause the processor to receive the image of the skin portion from an electronic communication device. The processor further processes the received image of the skin portion, wherein the processing comprises at least one of: resizing, removing artifacts and noise, applying new color space, sharpening the image and correcting background. Furthermore, the processor segments the processed image to identify region of interest within the processed image. Also, the processor extracts one or more features from the identified region of interest. The processor further classifies the skin disorder by mapping the one or more extracted features with pre-stored images, wherein the pre-stored images that map with the one or more extracted features are associated with a particular category of skin disorder. The processor also renders the classification of the skin disorder on the electronic communication device.

These together with other embodiments of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawing and descriptive matter in which there are illustrated exemplary embodiments of the present invention.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

For a thorough understanding of the present invention, reference is to be made to the following detailed description, including the appended claims, in connection with the above-described drawing. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The terms "a" and "an" herein do not denote a limitation of quantity, but rather denote the presence of at least one of the referenced item.

Figure 1:
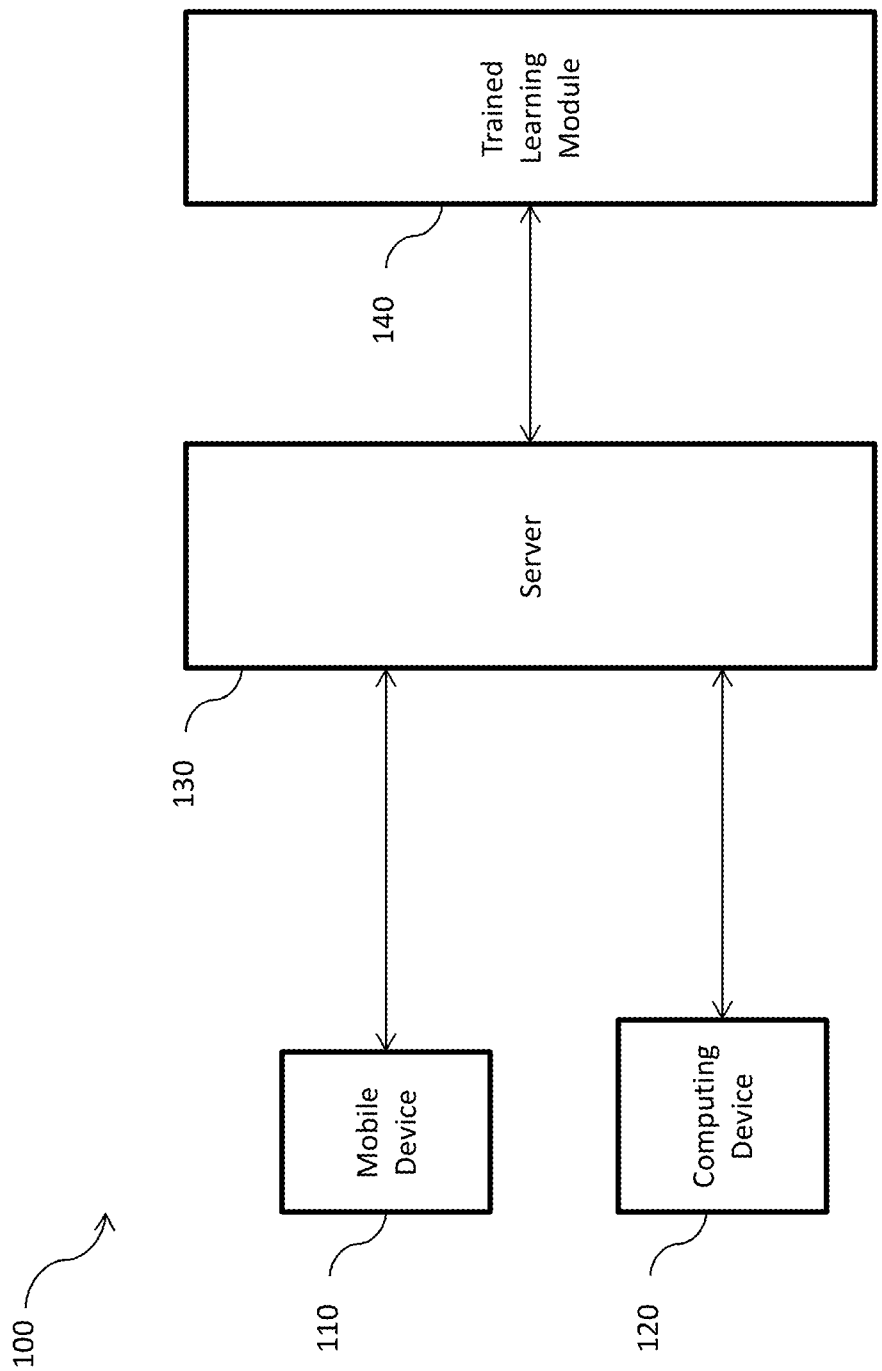
FIG. 1, depicts a block diagram of the present system, in accordance with an embodiment of the present invention.

FIG. 1 depicts a block diagram of an exemplary embodiment of the present invention. In the said exemplary embodiment, a system 100 for processing an image of a skin portion is depicted. The system 100 includes a mobile device 110 with image capturing capability. In an embodiment of the present invention, the mobile device 110 is an electronic communication device comprising a camera. The mobile device 110 may capture the image of the infected skin portion and send the captured image to a server 130. The server 130 includes a processor, a volatile memory such as RAM and the like, a digital storage media such as a hard disk storage and the like, a non-volatile memory such as a ROM and the like. The server 130 is communicably coupled to a distributed network. In an exemplary embodiment of the present invention, the distributed network is World Wide Web. The mobile device 110 may send the captured image using the wireless communication that may include sending the image using the GPRS technology which provides packet data transmission over the cellular network. In yet another embodiment of the present invention, the mobile device 110 may send the captured image to the server 130 using internet provided by other means such as connection with an internet enabled computing system or using wireless technology. In another embodiment of the present invention, a user may send the captured image to the server 130 using a computing device 120. The computing device may provide the captured image to server through internet. The server 130 receives the captured image of the skin portion from the mobile device 110 via internet. The server 130 upon receiving the image of the skin portion processes the same. The processed image is segmented by the server 130. The server 130 extracts the features from the processed and segmented image of the skin portion. The extracted features of the skin portion are provided to a trained learning module 140. In an embodiment of the present invention, the trained learning module is a back propagation neural network. The trained learning module 140 may include a database (not shown) wherein an image repository is stored. The trained learning module 140 identifies the classification of the skin disorder depicted in the image of the skin portion based on extracted features. In an embodiment of the present invention, the trained learning module 140 is a repository of pre-stored images that identifies the classification of skin disorder. The pre-stored images are associated with a particular category of skin disorders. The trained learning module 140 is configured to map the extracted features with the pre-stored images so as to identify the category of skin disorder associated with the mapped pre-stored images. The trained learning module 140 upon identifying the classification provides the identified classification to the server. In an embodiment of the present invention, the server 130 is configured to provide the identified classification to the user. In an exemplary embodiment of the present invention, the server 130 provides the identified classification to the mobile device 110 or computing device 120 via internet.

In an exemplary embodiment of the present invention, the server 130 prompts a user to register with the server 130. The registration process may include providing details of the user to create a profile of the user. The details mentioned herein may include name, age, address, date of birth, gender and the like. In yet another embodiment of the present invention, the user is required to pay specified fee for using the service of diagnoses of skin disorder by means of present invention. The said means may include a payment gateway.

Figure 2A:
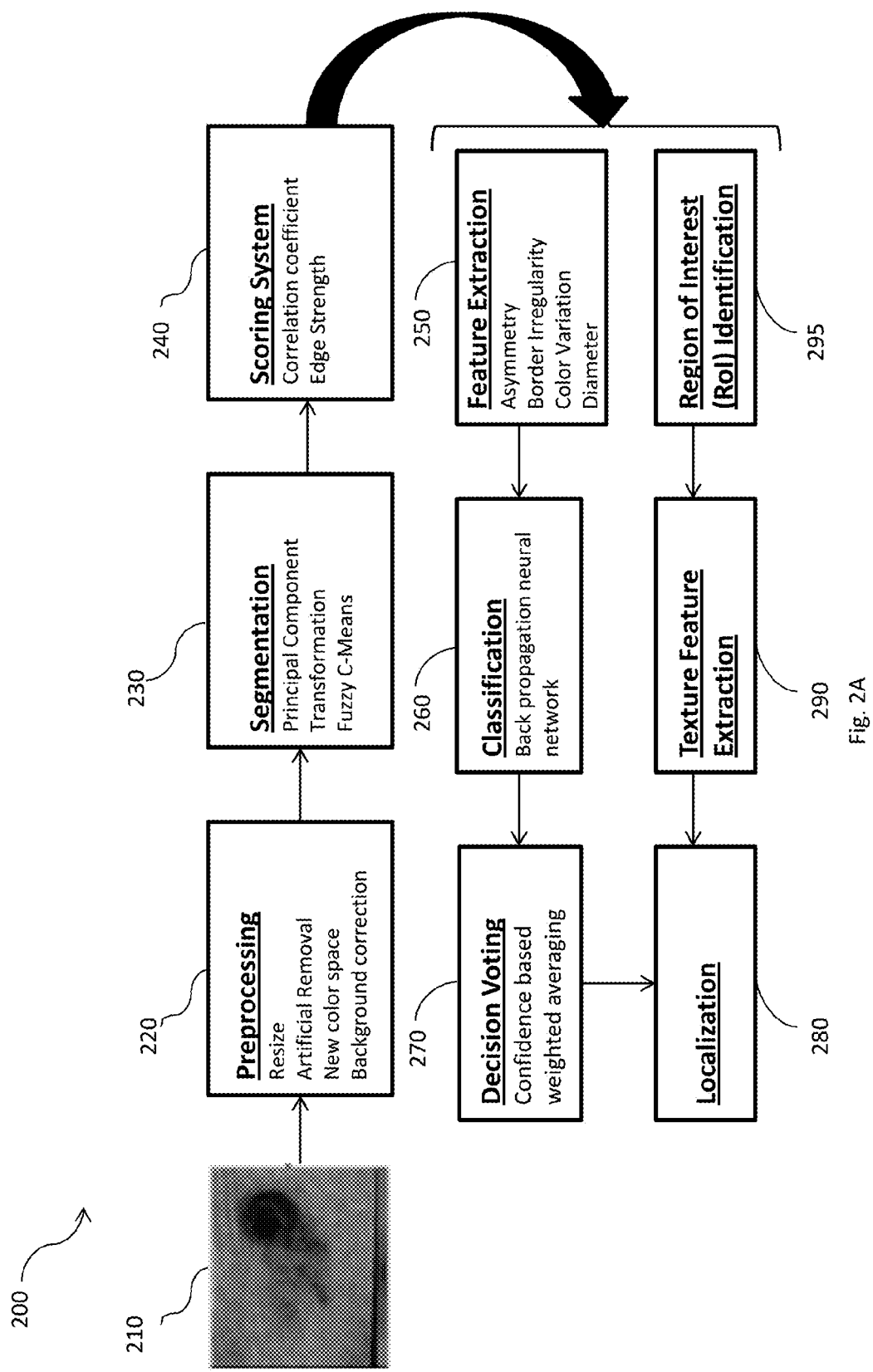
FIG. 2A, depicts a block diagram of the process incorporated in the present invention, in accordance with an embodiment of the present invention.

FIG. 2A depicts a block diagram of an embodiment of the present invention. In the said embodiment, an image of infected skin portion is taken by a user using an image capturing device. The image capturing device may be a cellphone camera or a digital camera. The image 210 of the skin portion is provided to the server 130. Referring to FIG. 1, the image 210 may be provided to the server 130 using World Wide Web or internet. The server 130 upon receiving the image 210, pre-processes 220 the captured image 210. In the step of pre-processing 220, the image 210 may be resized, artifact may be removed, new color space may be applied and background may be corrected. In an embodiment of the present invention, the step of processing comprises pre-processing and post-processing. The processed image 210 is then segmented. The step of segmentation 230 includes applying principal component transformation (PCT) and fuzzy C-means.

For extracting features from the region of interest (ROI), image 210 is segmented into regions. Fuzzy C-Means algorithm was used to segment images according to occurrence of color variations in the image 210. The region of interest is identified in the image 210 and separated from image 210. In an embodiment of the present invention, defect segmentation of skin may be seen as an instance of segmentation in which number of segmentation is not clearly known. The server 130 performs the segmentation 230 of the image 210 as per the following steps:

Input the image 210

Transform the image 210 from RGB to L*a*b *Color space. The reason L* a*b color space consists of a luminosity layer in 'L*' channel and a*, b* are the two chromaticity layers. It is computationally efficient since all the color information present in the a* and b* layers only.

Classify Color channels using Fuzzy C means clustering in a*b* space. The difference between two color channel is computed using the Euclidean distance metric.

Each pixel labeled in the image 210 from the result of Fuzzy C Means clustering algorithm. For every pixel in our input, Fuzzy C-means computes the index according to its cluster index.

Generate an image that segmented the input Image by color.

Programmatically compute the index of each cluster containing the infected part of the skin image 210 because clustering algorithm does not return the same cluster index value of clusters, which contains the means value of color channels for each cluster. Texture and color feature have received more attention and perform better than other image based features in the case of skin diseases classification problem. Geometrical properties are utilized in this approach, such as structure of the region, region position and compactness. Each region is obtained by the principal components of the region locations. The segmented images have a size of m×n (m*n) pixels.

The PCA based ROI/Eigen regions are estimated on a set of (N) regions obtained via the segmentation of skin images. The general PCA analysis is as follows: Let R be the Region matrix and $\bar{R}$ be the mean over all observations of R. S is defined as R with $\bar{R}$ subtracted from each of its columns. The covariance matrix is Cov=S*$\bar{S}$ and the signal value decomposition of Cov gives C=V*Λ*V$^T$ where V is the eigenvector matrix and Λ is the diagonal matrix containing the eigenvalues. Using this method, region based features will be in largest variance. The importance to the classification is the fact that the orthogonal eigenvectors. This implies that, all the used features in the selection features are independent.

The processed and segmented image 210 is scored using a scoring system 240. In the step of scoring system 240, the correlation coefficient is calculated and calculations regarding edge strength are carried out. After the PCA based segmentation, a scoring system is used to obtain the best-segmented image. The parameters used for scoring system are the correlation coefficient between all pairs of segmented ROI image and the edge strength of the particular segmented image. Details of how correlation coefficient and edge strength were found out are described below.

Correlation Coefficient: The Pearson's correlation method used for measure the statistical correlation between two segmented regions. Purpose of the correlation coefficient here is to compare two images for selecting the best PCA based ROI. It is described as follows:

$$r = \frac{\sum_i (x_i - x_m)(y_i - y_m)}{\sqrt{\sum_i (x_i - x_m)^2} \sqrt{\sum_i (y_i - y_m)^2}}$$

where $x_i$ is the intensity of the ith pixel in the ROI segmentation 1, $y_i$ is the intensity of the ith pixel of the ROI segmentation 2, $x_m$ is the mean intensity of ROI 1 and $y_m$ is the mean intensity of ROI 2.

Edge Strength: The edge strength relies on the gradient of an image and is computed as follows: Estimate the gradient magnitude image pixel of a grayscale image using $Z=\sqrt{X^2+Y^2}$ where X and Y are the row and column wise image differences. Multiply the gradient magnitude image with the dilated boundary of the infected region as identified by a given method, to obtain only pixels that lie on the infected region boundary. Compute the edge strength as the ratio of the sum of gradient magnitude pixel values that lie on the boundary divide by the total number of gradient magnitude pixels.

$$\text{Edge Strength} = \frac{\sum_{p \in Edge} \text{Gradient}(p)}{N}$$

where Gradient (p) represents edge points gradient values and N number of edge pixels. Once the correlation coefficient and edge strength are computed the scoring system works as follows: If the correlation coefficient between two or more image segments is greater than 0.8, then these images are given 1 point each. The segmented image that has the largest edge strength is allotted an additional point. The sum of all points allotted to each segmented method is calculated, and the method that scores the most points is selected as the final ROI results. Also the area boundary of that ROI is considered as the final result.

Thereafter, features are extracted from the captured image 210. By extracting features, the captured image data is narrowed down to a set of features which can classify the corresponding images into different categories. The following features are extracted from the image 210 asymmetric nature of the image, border irregularity, color variation, diameter of the infected area, texture and the like. Upon extraction of features from the image 210, the image 210 undergoes classification 260. The classification 260 includes a back propagation neural network. The neural network is used with the number of inputs to the neural network (i.e. the number of neurons) is equal to the number of texture features listed above. The number of output is 6 which is the number of classes representing the 5 diseases studied along with the case of control group (normal skin). The 5 diseases mentioned herein may include dry skin, skin cancer or melanoma, fungal infection, viral infection, bacterial infection or combination thereof. In an exemplary embodiment of the present invention, the server 130 is further configured to identify additional skin diseases or disorders.

Figure 2B:
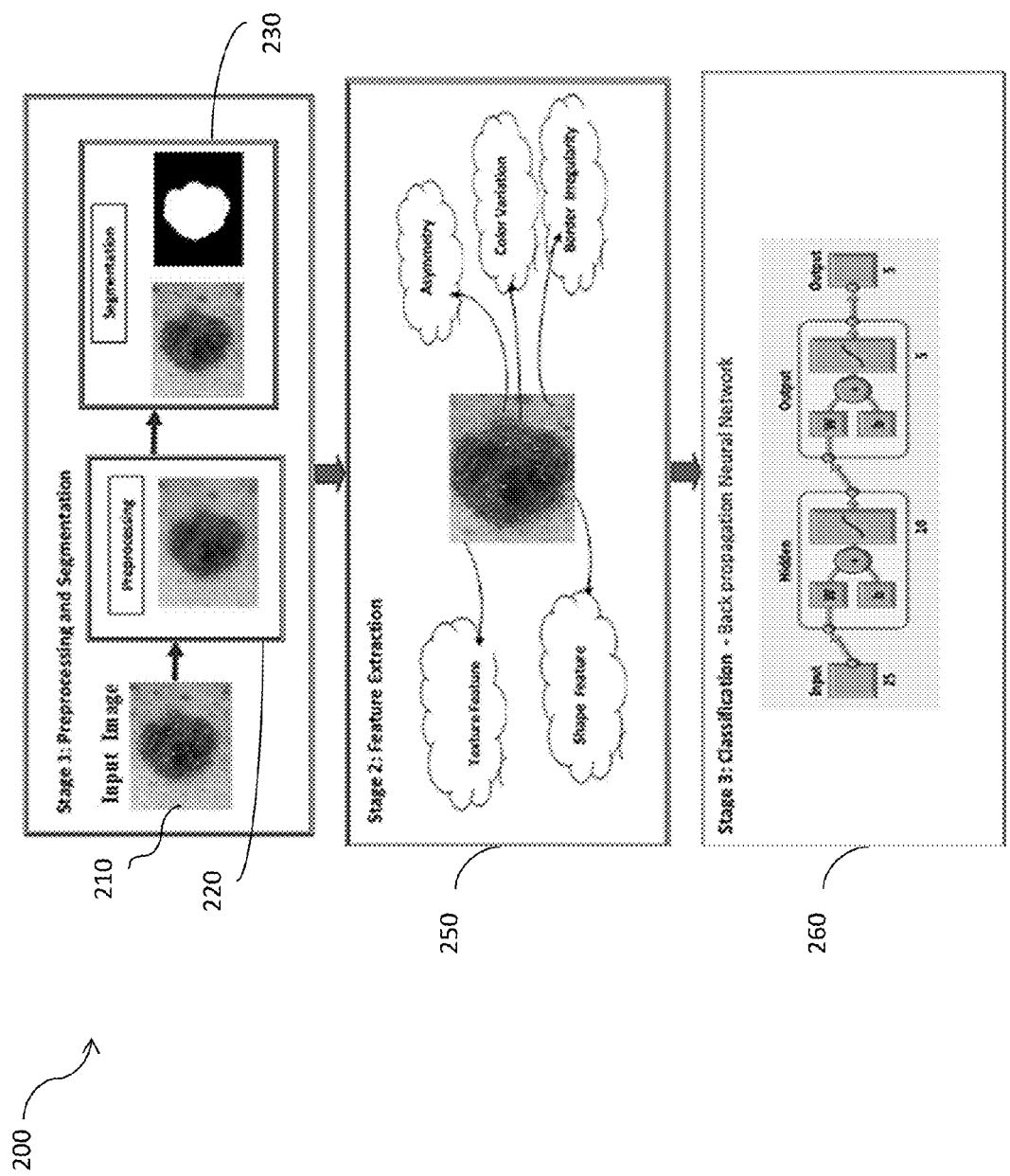
FIG. 2B, depicts a block diagram of the process incorporated in the present invention, in accordance with an embodiment of the present invention.

FIG. 2B depicts a block diagram, in accordance with an embodiment of the present invention. In the said block diagram, the image 210 upon receiving is processed by the server 130 in the pre-processing 220 step. The processed image 210 is then segmented in segmentation 230 step. Features are extracted from processed and segmented image 210. In the step of feature extraction 250, texture feature, shape feature, asymmetry, color variation and border irregularity may be extracted. Based on the feature extracted from the image 210 in the feature extraction step, the captured image is classified. The classification 260 may be carried using back propagation neural network. The step of processing is carried out on the image 210 as generally, dermatoscopic image consists of noises in the form of artifacts such as ruler markings, air bubbles, black frames, ink markings etc. The presence of such noises in the image may cause inaccuracy in classification. The image 210 is processed through filtering to remove the noise and to remove unwanted digital content such as light flecks and highlight the desirable features easily. In an embodiment of the present invention, median filtering is used for processing to facilitate smoothing image from noise. Median filtering is used for minimizing the influence of small structures like thin hairs and isolated islands of pixels like small air bubbles. The median filter is a non-linear digital filtering technique, often used to remove noise from images or other signals. It is particularly useful to reduce speckle noise and salt and pepper noise. Post-processing is done to enhance the shape and edges of image. In addition, contrast enhancement can sharpen the image border and improve the accuracy for segmentation. Segmentation eliminates the normal skin from the dermatoscopic image and identifies the region of interest. In an embodiment of the present invention, the region of interest within the processed image is the infected skin portion. Threshold Segmentation based segmentation technique is used. This method provides an accurate and efficient way to perform this segmentation, based on the intensities in the background and foreground regions of the image 210. Typically a gray scale or colour image is input to this operation. After segmentation, binary image is the output. This technique is accomplished by scanning the entire image pixel by pixel and labeling each pixel as object or background according to its binarized gray level.

Numerical characterization of the image 210 appearance is difficult. The skin surface is a detailed landscape, with complex geometry and local optical properties. In addition, skin features depend on many variables such as body location like forehead or cheek, subject parameters like age or gender and imaging parameters like lighting or camera and also the direction from which it is viewed and illuminated. In general all skin infections affect the skin by decolorizing it and distorting the skin in places of infection. In more advanced cases, they also cause blisters and different skin textures. It can be described using major descriptors such as are color, texture, shape, spatial location.

1. For color, it is the dominant color descriptor, the scalable color, color structure, color layout and group of frame descriptor.
2. Texture can be described in terms of how homogenous the texture is, the texture browsing descriptor and edge histogram.
3. Shape is described using a region based descriptor. Also area and perimeter of the shape calculated.

In general all skin infections affect the skin by decolorising it and distorting the skin in places of infection. In more advanced cases, they also cause blisters and different skin textures. It can be described using five major features which are Asymmetry, Border Irregularity, Color Variation and Diameter and texture.

1. Asymmetry Feature: Asymmetry Index (AI) is a feature, which is used to measure the area of significant infected pixels based on ROI.

$$AI = 100 * \frac{(\text{Right} - \text{Left})}{1/2(\text{Right} + \text{Left})}$$

where Left and Right stands for the values on the left and right sides of the major axis. Similarly we have calculated AI for minor axis.

2. Border Irregularity: Border irregularity feature consists of four different descriptions i.e. Dimension, Compactness Index, Edge sharpness and pigmentation Transition a. Dimension Dimension size is generally an integer, such as the line has dimension 1, the edges dimension 2 and 3 dimensional cube and so on. This feature can be used as a one of the characteristic the image. Dimension can be calculated by the method MATLAB box counting. This technique divides the image into the boxes in different sizes (r). In general, use the box grid that divides the image into a pixel size r*r. N(r) is evaluated as the number of pixels that contains pieces of infected area (ROI). Different pixel size and r is obtained as a slop regression line fd.

$$N(r) = r - fd$$

where is a constant
b. Compactness Index $$m_e = \frac{1}{K} \sum_{k=1}^{K} e(k)$$

$$v_e = \frac{1}{K} \sum_{k=1}^{K} e^2(k) - m_e^2$$

Compactness Index (CI) is the measurement of the 2D objects estimates. However, this measure is very to external noise. The boundary term augmented the square of the perimeter $$CI = \frac{P_l^2}{4\pi A}$$

Pl is perimeter of the infected area (ROI). A is area of infected region.
To find the perimeter, user the Robert edge detector to detect the edges.

Filter's used in this technique is:

$$H = [\,-1\ \ 1\,]\ \text{and}\ V = \begin{bmatrix} -1 \\ 1 \end{bmatrix}$$

c. Edge Abruptness
Infected Area with regular and irregular boundaries has a large difference in radial distance (Distance between the center of ROI and its boundary)
d. Pigmentation Transition
This feature explores transition of skin pigmentation between infected skin and normal skin. The gradient magnitude of intensity component along with boundary of the infected area is estimated. From this we obtained gradient value of K, e(k) (1<=k<=1), where K is the limiting sample size) that describes locally the transition between the injury points of skin image each side. For global description of image, we use the mean me and variance ve of the gradient magnitude values e(k) which describes the global variants and steepness.

$$lum(i,j) = \frac{1}{3}[R(i,j) + G(i,j) + B(i,j)]$$

where
R—Red channel
G—Green channel
B—Blue channel $$m_e = \frac{1}{K}\sum_{k=1}^{K} e(k)$$

$$v_e = \frac{1}{K}\sum_{k=1}^{K} e^2(k) - m_e^2$$

3. Color Variations
Color variation is the one of the important characteristic of dermatoscopic images classification. Because every diseases has its own symptoms or color changes in the skin like brown, dark brown or black depending on the different depths in the skin. To limit further diseases diagnosis, the color variation described by color homogeneity and variations.
4. Diameter
Skin diseases tend to grow larger than common moles, and especially the diameter of 5 mm. Because the infection is often irregular form, to find the diameter, drawn from the all the edge pixels to the pixel edges through the mid-point and averaged.
5. Texture Features
Texture is an important characteristic for the investigation of dermatoscopic image analysis. It is a combination of repeated patterns with a regular frequency. It is a very interesting image feature that has been used for parameterization of the images.
In this proposed technique the gray level co-occurrence matrix is constructed based on the orientation and distance between image pixels. Some of the meaningful statistical characteristics are from this matrix, as the numeric representation of texture.
The gray level co-occurrence matrix P(i,j) is defined by a displacement vector dxy=(dx,dy) and then counting all pairs of pixels separated by the displacement dxy and having gray level i and j. The matrix P(i,j) is normalized by dividing each element in the matrix by the total number of pixel pairs. Using this matrix, the texture feature parameters are estimated as follows:
a. Contrast
Contrast is defined as the difference between the highest and the smallest values of the adjacent set of pixels considered. Mathematically, contrast can be represented as:

$$\sum_{i,j} |i-j|^2 P(i,j)$$

when i and j are equal, the pixel P(i,j) is on diagonal and (i−j)=0. It means that pixels entirely similar to its neighbor, so the weight is 0. If i and j differs by 1, there is a small contrast, and weight is 1. If i and j differ by 2, contrast is increasing and the weight is 4. The weight continues to increase exponentially as (i−j) increases.
b. Homogeneity
The homogeneity of the image is described as a transition zone of lighter or darker zone when the scan cuts horizontally and vertically.
It assesses image homogeneousness and for smaller difference between grey vales it takes on larger values $$\sum_{i=0}^{N-1}\sum_{j=0}^{N-1} \frac{p(i,j)}{1+|i-j|}$$

c. Energy
Energy is a measure of uniformity where is maximum when the image is constant. The energy of the image is defined as follows:

$$E = \sum_{i=1}^{K}\sum_{j=1}^{K} P_{i,j}^2$$

d. Entropy
It measures the randomness of the elements of the co occurrence matrix. Entropy is maximum when elements in the matrix are equal while is equal to zero if all elements are different. It is mathematically defined as follows:

$$Ent = \sum_{i=1}^{K}\sum_{j=1}^{K} P_{i,j}\log_2(p_{ij})$$

These four features are combined with the nine features computed for each color component resulting in 13 element features vector use to characterize the dermatoscopic images in this work.
CLASSIFICATION: A feed forward multilayer network is used in this proposed method and Back propagation (BPN) algorithm is used for training. The neural network works in a supervisory mode where in the weights of the network are optimized by mapping a specific set of input feature vectors with a specific target. The modification of the weights is according to the gradient of the error curve, which points in the direction to the local minimum. Thus making it much reliable in prediction as well as classifying tasks. In this proposed work, feed forward back propagation algorithm Neural Network (NN) is with adaptable learning rate. The NN have an input layer (13 neurons), a hidden layer and output layer (1 neuron). The tan sigmoid function is used as a activation function, for both the output and hidden layer. A hidden layer consists of 15 neurons is used in this network model. Learning rate of 0.01 and Mean Square Error (MSE) threshold of 0.005 for convergence was used to build the neural network model. The input feature vector to the neural network contains 13 components these are texture, color and structure based dermatoscopic image parameters. Based on the error in classification, the weights are adjusted in the hidden and output layer nodes. In training, the signal flow will be in feed forward direction, based on error propagation, weights are updated to reduce the errors. In the beginning of training, weights are initialized randomly. There will be a desired output, for which the training is done. Decision making was performed in the feed forward mode by providing an unknown input feature vectors as input.

Figure 3:
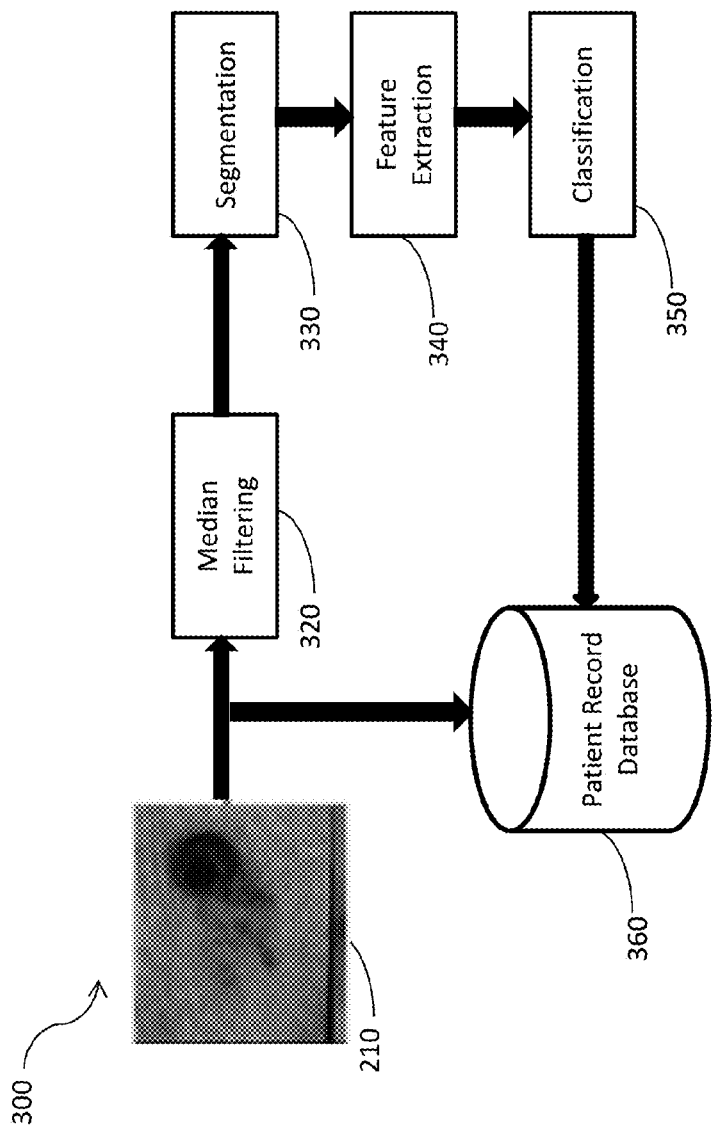
FIG. 3, depicts a block diagram of the present system, in accordance with an embodiment of the present invention.

FIG. 3 depicts a block diagram, in accordance with an embodiment of the present invention. In the said embodiment, an image is received at the server 130. The server 130 carries a median filtering 320 to the image 210. The median filtered image is then segmented 330 and features are extracted 340 from the segmented image. The server 130 than classify 350 the image based on the features extracted from the image 210. A patient record database 360 is maintained at the server 130.

In yet another embodiment of the present invention, the server 130 upon receiving the image 210 from the user provides the same to a physician. The server 130 provides the image 210 to the physician using internet. The physician may review the image and provide an opinion to the server 130. The server 130 receives the physician's opinion and provides the same to the user using the internet. In yet another embodiment of the present invention, if the trained learning module 140 is not able to identify the classification of the image then the trained learning module 140 communicates the same to the server 130. The server 130 provides the image 210 to the physician for opinion. The server 130 upon receiving the opinion from the physician provides the opinion to the user. The server 130 may store details of a set of physician to provide the image 210 to any of them when the trained learning module 140 is not able to identify the classification of the image 210.

In yet another embodiment of the present invention, the system 100 may be able to classify the image 210 as belonging to a particular category of skin disorder. In an embodiment of the present invention, the categories of skin disorders include, but not limited to, bacterial infection, viral infection, fungal infection, cancerous (melanoma), dry skin and normal skin condition. Server 130 part of the system 100 is hosted in cloud and would have a java servlet for processing and classifying the image 210 and to store the image 210 in a database. Such a system 100 may assist the physician to diagnose a dermatological condition of a remotely located patient. System 100 throughput time is fast and may be implemented in multiple ways such as through mobile phones, computers and various smart devices. Moreover, it may be safely handled by non-specialized or poor-skilled medical personnel. In an exemplary embodiment of the present invention, a user part (not shown) of the system 100 is provided. The user part of the system 100 may be a mobile application that may be downloaded and used from any internet enabled mobile. It may help in transferring the image taken from the mobile to the servlet hosted on cloud. Servlet hosted on cloud has a series of algorithms which enable it detect whether there is any abnormality or not in the received image. The image 210 that is being received by the servlet and response of the system would be stored in the database and would be sent to the medical expert and after actual confirmation from the medical expert the response may be sent back to the patient via a short message service.

Figure 4:
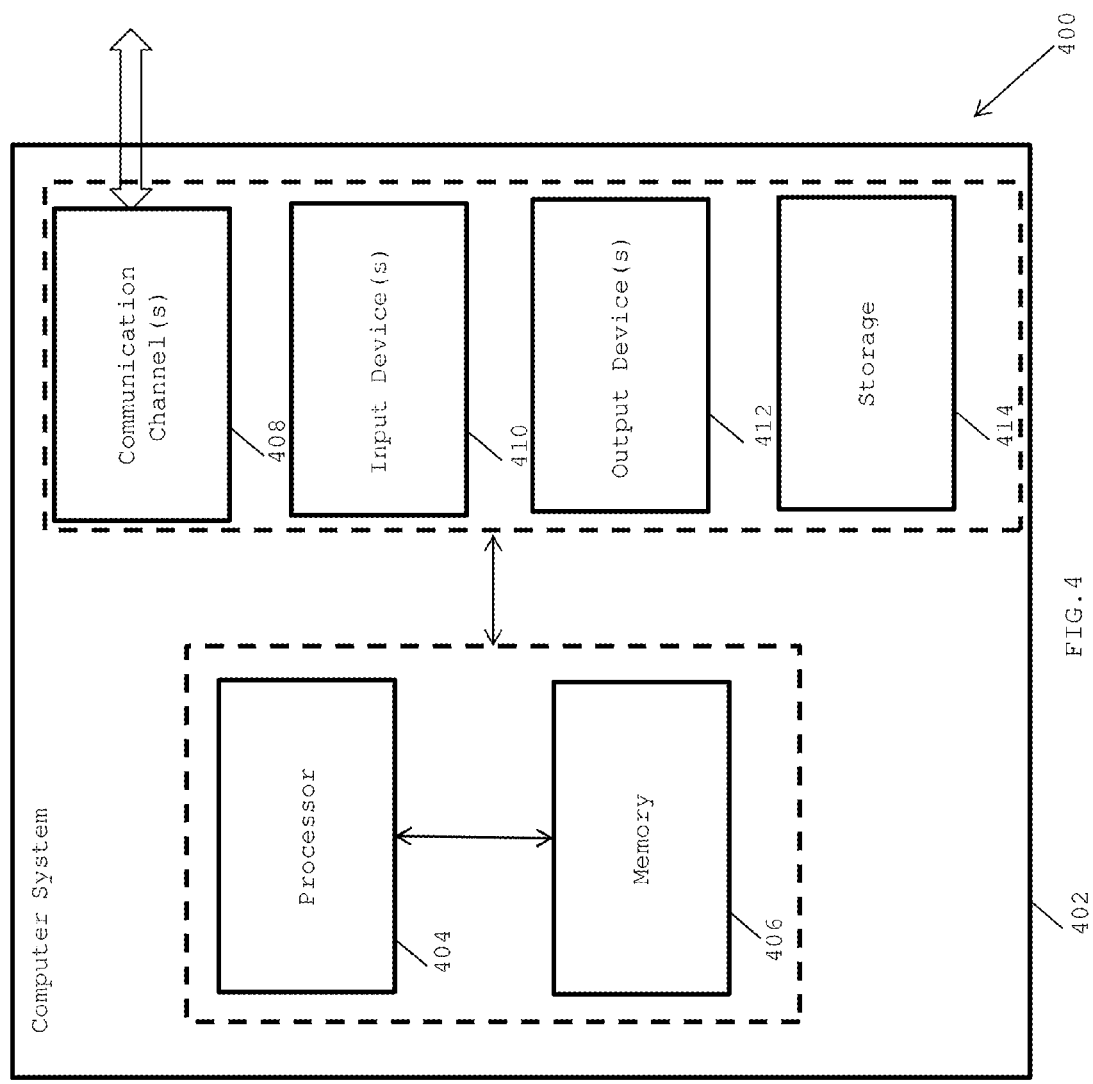
FIG. 4, illustrates an exemplary computer system in which various embodiments of the present invention may be implemented.

FIG. 4 illustrates an exemplary computer system in which various embodiments of the present invention may be implemented. The computer system 402 comprises a processor 404 and a memory 406. The processor 404 executes program instructions and may be a real processor. The processor 404 may also be a virtual processor. The computer system 402 is not intended to suggest any limitation as to scope of use or functionality of described embodiments. For example, the computer system 402 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various software executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 410 may include, but not limited to, a keyboard, mouse, pen, joystick, trackball, a voice device, a scanning device, or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention is advantageous over the prior arts. The present invention is simplistic and inexpensive, extensive reach in remote areas, intelligent Decision Making Software System which could assist the physician to recommend or suggest medical advice, could provide a real competitive advantage in the way we price as it is a Healthcare-On-Demand service and has ability to scale-up to meet future needs (Coverage/New Features). The present invention provides a system for processing an image of infected skin portion that is easily and widely accessible by people through a common channel i.e internet. The cost of ownership to avail the service of diagnosing skin disorders using present invention is less for common public as image may be captured using any digital camera and captured image may be provided to server 130 using internet. The present invention provides a computing system that is capable of diagnosing plurality of skin infections and provides the result of the diagnosis in minimal time by sending the diagnosis result via electronic communication means such as SMS, MMS, and electronic report over the internet and the like.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present invention.

We claim:

1. A system for classifying skin disorders using an image of a skin portion, the system comprising:
   a server configured to:
      receive the image of the skin portion from an electronic communication device;
      process the received image of the skin portion, wherein the processing comprises at least one of: resizing, removing artifacts and noise, applying new color space, sharpening the image and correcting background;
      segment the processed image into two or more regions within the processed image;
      scoring each of the two or more regions based on a correlation coefficient and an edge strength parameter,
         wherein the correlation coefficient is determined for at least one pair of the segmented two or more regions based on intensity of at least one pixel in the pair of the segmented two or more regions; and
         further wherein the edge strength parameter is determined for each of the two or more re ions based on a sum of gradient magnitude pixel values which lie at a boundary of the segmented region and a total number of gradient magnitude pixels of the segmented region;
      identify a region of interest from the two or more regions based on the score of the two or more regions; and
      extract one or more features from the identified region of interest; and
   a trained learning module, comprising a repository of pre-stored images, configured to:
      classify the skin disorder by mapping the extracted features with the pre-stored images, wherein the pre-stored images that map with the extracted features are associated with a particular category of skin disorder.

2. The system of claim 1, wherein the server is further configured to render the classification of the skin disorder by the trained learning module on the electronic communication device.

3. The system of claim 1, wherein the electronic communication device comprises a camera for capturing the image of the skin portion.

4. The system of claim 1, wherein the one or more extracted features from the identified region of interest are at least one of: texture, shape, asymmetry, color variation, border irregularity and diameter.

5. The system of claim 1, wherein the categories of skin disorders are at least one of: skin cancer, melanoma, fungal infection, viral infection, bacterial infection and dry skin.

6. The system of claim 1, wherein the processed image is segmented using principal component transformation and fuzzy-c means algorithm to identify the region of interest within the processed image.

7. The system of claim 1, wherein the region of interest within the processed image is an infected skin portion.

8. The system of claim 1, wherein the trained learning module is a back propagation neural network.

9. A computer-implemented method for classifying skin disorders using an image of a skin portion, via program instructions stored in a memory and executed by a processor, the computer-implemented method comprising:
   receiving the image of the skin portion from an electronic communication device;
   processing the received image of the skin portion, wherein the processing comprises at least one of: resizing, removing artifacts and noise, applying new color space, sharpening the image and correcting background;
   segmenting the processed image into two or more regions within the processed image;
   scoring each of the two or more regions based on a correlation coefficient and an edge strength parameter,
      wherein the correlation coefficient is determined for at least one pair of the segmented two or more regions based on intensity of at least one pixel in the pair of the segmented two or more regions; and
      further wherein the edge strength parameter is determined for each of the two or more regions based on a sum of gradient magnitude pixel values which lie at a boundary of the segmented region and a total number of gradient magnitude pixels of the segmented region;
   identify a region of interest from the two or more regions based on the score of the two or more regions;
   extracting one or more features from the identified region of interest;

classifying the skin disorder by mapping the one or more extracted features with pre-stored images, wherein the pre-stored images that map with the one or more extracted features are associated with a particular category of skin disorder; and rendering the classification of the skin disorder on the electronic communication device.

10. The computer-implemented method of claim 9, wherein the electronic communication device comprises a camera for capturing the image of the skin portion.

11. The computer-implemented method of claim 9, wherein the one or more extracted features from the identified region of interest are at least one of: texture, shape, asymmetry, color variation, border irregularity and diameter.

12. The computer-implemented method of claim 9, wherein the categories of skin disorders are at least one of: skin cancer, melanoma, fungal infection, viral infection, bacterial infection and dry skin.

13. The computer-implemented method of claim 9, wherein the step of segmenting uses at least one of: principal component transformation and fuzzy c-means algorithm to identify the region of interest within the processed image.

14. The computer-implemented method of claim 9, wherein the region of interest within the processed image is an infected skin portion.

15. A computer program product for classifying skin disorders using an image of a skin portion, the computer program product comprising:

a non-transitory computer-readable medium having computer-readable program code stored thereon, the computer-readable program code comprising instructions that when executed by a processor, cause the processor to:

receive the image of the skin portion from an electronic communication device;

process the received image of the skin portion, wherein the processing comprises at least one of: resizing, removing artifacts and noise, applying new color space, sharpening the image and correcting background;

segment the processed image into two or more regions within the processed image;

scoring each of the two or more regions based on a correlation coefficient and an edge strength parameter, wherein the correlation coefficient is determined for at least one pair of the segmented two or more regions based on intensity of at least one pixel in the pair of the segmented two or more regions; and further wherein the edge strength parameter is determined for each of the two or more regions based on a sum of gradient magnitude pixel values which lie at a boundary of the segmented region and a total number of gradient magnitude pixels of the segmented region;

identify a region of interest from the two or more regions based on the score of the two or more regions;

extract one or more features from the identified region of interest;

classify the skin disorder by mapping the one or more extracted features with pre-stored images, wherein the pre-stored images that map with the one or more extracted features are associated with a particular category of skin disorder; and render the classification of the skin disorder on the electronic communication device.

* * * * *